UNITED STATES PATENT OFFICE.

MICHAEL J. CALLAHAN, OF PITTSFIELD, MASSACHUSETTS, ASSIGNOR TO GENERAL ELECTRIC COMPANY, A CORPORATION OF NEW YORK.

CONDENSATION PRODUCTS AND PROCESS OF TREATING THE SAME.

1,108,329.      Specification of Letters Patent.      Patented Aug. 25, 1914.

No Drawing.      Application filed May 11, 1912. Serial No. 696,704.

*To all whom it may concern:*

Be it known that I, MICHAEL J. CALLAHAN, a citizen of the United States, residing at Pittsfield, county of Berkshire, State of Massachusetts, have invented new and useful Improvements in Condensation Products and the Process of Treating the Same, of which the following is a specification.

The present invention relates to the preparation of hard, insoluble, gummy or resinous products by the interaction or condensation of organic compounds containing alcoholic hydroxyl groups, such as are produced when the polyhydric alcohols interact with polybasic acids or their anhydrids of the cyclic series. The reaction products of this class of compounds, as formerly produced have been filled with cavities caused by the escape of vapors. In accordance with my present invention, these materials are obtained in a compact condition free from bubbles. This result is mainly secured by carrying out the final stage of the reaction at a moderate temperature for a protracted period of time.

As an illustration of my invention I shall describe the reaction between phthalic anhydrid and a polyhydric-alcohol of the aliphatic series, such as glycerin. The reaction takes place in two stages. Two parts by weight of phthalic anhydrid are mixed with one part by weight of glycerin and are slowly heated in a suitable container. This proportion provides an excess of the anhydrid, but if desired a greater excess may be used. At about 100° C. the glycerin and the anhydrid fuse down to a clear liquid and as the heating continues a slight distillation begins. The temperature then may be increased to about 185° C. and should then be maintained constant for some time until distillation ceases. The heating may then be continued at this temperature, or preferably at a somewhat higher temperature—say, 210° C. until the first stage of the reaction is completed. The proper point for interrupting the reaction may be ascertained by taking small samples from the mass and observing whether the sample is hard and brittle without stickiness after cooling. As soon as this point is reached the heating is discontinued and the product allowed to cool. The product solidifies to a brittle, transparent mass somewhat yellowish in color. It is fusible and soluble in acetone. The acetone solution is clear and may be used as a varnish.

If the heating is continued at the temperature mentioned, the second stage of the reaction takes place with the evolution of heat and a rapid rise in temperature. A violent ebullition sets in at about 275° C. and continues until a hard, infusible, brittle mass filled with cavities is obtained. Even if the temperature is maintained at 210° C., the second reaction takes place with bubbling.

In accordance with my invention, the hardening or polymerization of the fusible acetone-soluble mass is carried out, not by heating to the high temperatures mentioned, but by heating the same at a moderate temperature, preferably about 85 to 100° C. for a time depending upon the mass of the material. In the case of a layer about .2 of an inch in thickness, the time required is about 15–20 hours. At this temperature no bubbles are evolved and, therefore, a homogeneous, dense product free from cavities is obtained. In some cases a higher temperature may be used, for example say 135° C. without evolution of bubbles. The hardening reaction may be carried out at atmospheric pressure, but pressure in excess of atmospheric is in some cases advantageous. The product softens at temperatures above 40° C. but never actually melts without decomposition. It is practically insoluble in the usual solvents.

The hardened resin may be saponified with an alkali to regenerate the polyhydric alcohol with the formation of the corresponding phthalate. It may be reconverted to the soluble state by heating in contact with glycerin or other polyhydric alcohol.

The hard, insoluble product of the interaction of glycerin and phthalic anhydrid possesses high dielectric strength and insulation resistance. I am enabled by the present invention to use it for the purpose of insulating electrical coils, for coating wires, condenser plates and the like. For this purpose, preferably the acetone solution of the intermediate product is impregnated in the usual fibrous coating of the parts to be insulated or is painted on in an appropriate way. The acetone is then evaporated either in vacuo or at atmospheric pressure and recovered if desired. If desired the impregnation or coating in some cases may be carried on with care with the fused intermediate product. The article impregnated or coated is then hardened as above described, by heating for a long period at, say, 85° to 135° C. The intermediate product may also be used for the purpose of producing molded materials or as a binder. To this end it may be powdered and molded with or without filling materials by methods well known in the art. After molding it is hardened as above described.

As the final substantially insoluble, infusible product softens somewhat without melting upon heating to a temperature of above 40° C., it may be molded to form a solid homogeneous mass by heating under pressure. For example, the hardened product may be ground and heated in a mold, preferably at a temperature of about 100° C. under pressure with or without a suitable filler, such as asbestos, ground minerals, as flint, also with wood fiber and the like. Of course, for this purpose the porous mass obtainable by rapid heating is as suitable as the homogeneous mass obtained by slow heating. The porous mass likewise may be consolidated without first comminuting it, by heating it under pressure to the temperature at which softening takes place. In this way the cavities may be eliminated.

I wish it to be understood that instead of an anhydrid such as phthalic anhydrid, the corresponding acid, in the above case phthalic acid, may be used.

Instead of glycerin other polyhydric alcohols, as glycol, or certain carbohydrates as glucose, saccharose, cellulose, starch or dextrin may be used. In this case the temperatures are controlled so as to cause a separation of the reaction into two stages and, to avoid the frothing during the second stage, the hardening reaction is carried out at a suitable moderate temperature until it is complete.

Where impregnated products, such as electrical coils, etc., are to be produced, it is in some cases advantageous to dissolve the desired quantity of phthalic anhydrid in the glycerin and impregnate before the reaction is initiated. After impregnation the reaction may be caused to take place in situ by heating the impregnated article in an oven to the reaction temperature. As above described, the hardening reaction should be caused to take place at a relatively low temperature 85-100° C. until the final hardening has taken place.

My application, Serial No. 747,114, filed February 8, 1913, describes and claims a product obtained by further heat treatment of the insoluble, infusible resin. This material is characterized by greater chemical inertness, superior dielectric properties and greater mechanical strength and hardness than the infusible product herein described.

What I claim as new and desire to secure by Letters Patent of the United States, is,—

1. The process of preparing a homogeneous infusible resinous product from a fusible condensation product of phthalic anhydrid and polyhydric alcohol which consists in heating said product to a temperature of about 135° C. until complete polymerization or condensation has taken place.

2. The process of preparing a homogeneous infusible resinous product from a fusible condensation product of an organic compound containing alcoholic hydroxyl groups and phthalic anhydrid which consists in heating said product to a temperature high enough to cause reaction to take place but low enough to avoid bubbling or frothing and continuing the heating until complete polymerization or condensation has taken place, without bubbling or frothing with the formation of a dense material which does not melt without decomposition.

3. The process which consists in heating a fusible intermediate reaction product of glycerin and phthalic anhydrid at a temperature of about 85 to 135° C. for several hours until said product is converted to an infusible, insoluble state.

4. The process which consists in heating a fusible acetone-soluble intermediate reaction product of glycerin and phthalic anhydrid at a temperature of about 85 to 135° C. at atmospheric pressure until said product has become substantially insoluble and infusible without decomposition.

5. A hard, infusible, insoluble condensation product of a polyhydric aliphatic alcohol and phthalic anhydrid having a dense, compact structure.

6. A hard, infusible, insoluble reaction product of glycerin and phthalic anhydrid having a dense, compact structure free from bubbles, and high dielectric and insulating properties.

7. The process which consists in applying to a body an acetone solution of a partial reaction product of glycerin and phthalic anhydrid and then heating said body at a high enough temperature to convert said partial reaction product into a hard, insoluble, infusible product, but low enough to avoid the formation of cavities.

8. The process which consists in impregnating a body with a partial reaction product of glycerin and phthalic anhydrid and then heating said body to a temperature of about 85 to 135° C. until complete polymerization or condensation has taken place in situ with the formation of a final hard, infusible product.

9. The process which consists in heating a mixture of phthalic anhydrid and a polyhydric alcohol of the aliphatic series until the mass upon cooling is hard and free from stickiness, giving the product the desired form and then continuing the reaction at a high enough temperature to produce further condensation with the ultimate formation of a substantially infusible, insoluble resin but low enough to avoid bubbling.

10. A hard, resinous infusible, saponifiable condensation product of phthalic anhydrid and a polyhydric alcohol, said product having a dense, compact structure, high dielectric and insulating properties, and being convertible to a fusible state by heating with glycerin.

In witness whereof, I have hereunto set my hand this 10th day of May, 1912.

MICHAEL J. CALLAHAN.

Witnesses:
BENJAMIN B. HULL,
HELEN ORFORD,